United States Patent [19]
Oikawa et al.

[11] Patent Number: 5,630,034
[45] Date of Patent: May 13, 1997

[54] THREE-DIMENSIONAL IMAGE PRODUCING METHOD AND APPARATUS

[75] Inventors: Michio Oikawa, Ebina; Koichi Sano; Yoshiaki Isobe, both of Yokohama, all of Japan

[73] Assignees: Hitachi, Ltd.; Hitachi Medical Corporation, both of Tokyo, Japan

[21] Appl. No.: 415,941

[22] Filed: Apr. 3, 1995

[30]     Foreign Application Priority Data

Apr. 5, 1994   [JP]   Japan ..................................... 6-067257

[51] Int. Cl.⁶ ..................................................... G06F 15/00
[52] U.S. Cl. .......................................................... 395/124
[58] Field of Search ...................................... 395/121, 119, 395/124; 345/118

[56]                References Cited

U.S. PATENT DOCUMENTS 5,265,197  11/1993  Kondo ..................................... 395/120

OTHER PUBLICATIONS

"Direct Visualization of Volume Data" IEEE CG & A, vol. 12, pp. 63–71 (Jul. 1992).
"Surface Rendering," IEEE CG & A, vol. 10, pp. 41–53 (Mar. 1990).
"Efficient Ray Tracing of Volume Data", ACM Trans. on Graphics, vol. 9, No. 3, pp. 245–261 (1990).
"Shell Rendering Fast Volume Rendering and Analysis of Fussy Surface" SPIE vol. 1653 Image Capture, Formatting and Display (1992), PP. 35–43.
"Volume Rendering", IEEE CG & A, vol. 8, No. 5, pp. 29–37, 1988.

Primary Examiner—Phu K. Nguyen
Attorney, Agent, or Firm—Antonelli, Terry, Stout & Kraus, LLP

[57]                ABSTRACT

A three-dimensional image producing method of determining, as display candidates, voxel data having a value exceeding a display threshold set for density, and voxel data of a specified classification selected from among voxel data classified into a plurality of display classifications, and projecting the voxel data as the display candidates onto a projection plane on the basis of predetermined display conditions to form a three-dimensional image.

22 Claims, 10 Drawing Sheets

THREE-DIMENSIONAL IMAGE PRODUCING METHOD AND APPARATUS

BACKGROUND OF THE INVENTION

The present invention relates to three-dimensional image producing methods and apparatus which produce an image by projection of a three-dimensional shape onto a two-dimensional plane on the basis of three-dimensional data which defines the three-dimensional shape, and display the image.

Conventionally, three-dimensional image producing techniques have been used widely which produce a two-dimensional image by projection of a three-dimensional shape determined on the basis of the values of three-dimensional data or volume data onto a two-dimensional projection plane. Such image is, of course, a two-dimensional image, but generally called a three-dimensional image. This term is used also in the description of this specification to denote a similar image.

One of conventional techniques which produce such a three-dimensional image is the volume rendering described in M.Levoy, "Display of Surface from Volume Data", IEEE CG & A, vol. 8, No. 5, pp. 29–37 (1988)".

In this technique, it is assumed that rays of light emitted from a two-dimensional projection plane are transmits through voxels each as a unit of volume data while undergoing attenuation. A quantity of attenuation which the rays of light from the respective voxels undergo before they arrive at the projection plane is calculated on the side of the projection plane to thereby obtain the brightness of the voxels projected to the projection plane.

In the technique described in Terry S. Yoo et al., "Direct Visualization of Volume Data", IEEE CG & A, vol. 12, pp. 63–71 (July 1992), an opacity is set in each voxel in dependence on its value. Respective parts of a three-dimensional shape are superposed as translucent to produce a two-dimensional image.

In the technique described in "Surface Rendering", IEEE CG & A, vol. 10, pp. 41–53 (March, 1990), volume data is divided along a plane. Two-dimensional images of different ones selected from among parts of each of the two volume data halves are formed, and combined into a complete image, which is then displayed. For example, a two-dimensional image is displayed which includes a combination of a right-hand half of a regular body surface (skin) and a left-hand half composed of bones.

Generally, in order to produce a three-dimensional image, much processing time is required because much data is required to be processed. Conventionally, various techniques have been proposed to speed up the production of a three-dimensional image.

For example, in the technique described in M. Levoy, "Efficient Ray Tracing of Volume Data", ACM Trans. on Graphics, vol. 9, No. 3, pp. 245–261 (1990), transparent voxels, i.e., having an opacity of 0, which do not influence the production of a two-dimensional image are put in a hierarchical structure. Those voxels are not subjected to processing to thereby speed up the production of a three-dimensional image. Processing is also speeded up by enhancing the resolution of highly changing voxels and decreasing the resolution of less changing ones.

In the technique described in J.K.Uduepa et al., "Shell Rendering: Fast Volume Rendering and Analysis of Fussy Surface", SPIE, vol. 1653, Image Capture, Formatting and Display, pp. 35–43 (1992), new volume data on a surface alone is produced from the original volume data and processed to speed up the whole processing.

The techniques for producing a three-dimensional image in a medical field are used to observe the inside of a human body from various angles and view points mainly on the basis of three-dimensional measured data on the human body obtained with an X-ray CT and/or an MRI device.

In those applications, the observation of the inside of a human body is performed, using that measured human body data values obtained with an X-ray CT and/an MRI device differ in value in terms of bones and internal organs. The observation of the inside of a human body is performed, for example, by displaying voxels alone which have measured data of more than a predetermined threshold, or by displaying the respective voxels on the basis of the respective opacities of the voxels set and changed in accordance with the measured data values, using the techniques described above in "Display of Surface from Volume Data", IEEE CG & A, vol. 8, No. 5, pp. 29–37 (1988) and "Direct Visualization of Volume Data", IEEE CG & A, vol. 12, pp. 63–71 (July, 1992).

The technique using the threshold, however, cannot extract and display only a bone whose measured data value is large and a blood vessel whose measured data value is smaller to know their positional relationship even when it is desired to do so. The technique for setting and changing the opacity is very difficult to set an appropriate opacity. When necessary and unnecessary parts of an object to be examined are displayed in a superimposed manner, a desired part is difficult to view.

Since the technique described in "Surface Rendering", IEEE CG & A, vol. 10, pp. 41–53 (March, 1990) displays, for example, a bone and a blood vessel as different parts of a body, their positional relationship cannot be gripped.

Since the difference in measured data value between a blood vessel and its neighboring tissues is small, extraction and display of data on the blood vessel is difficult. In order to avoid this problem, injection of a contrast medium into a blood vessel and then data measurement have been widely performed when an X-ray CT is used. This allows extraction of the image of a blood vessel. When the wall of the blood vessel is to be displayed in terms of its inside and outside, however, troublesome and complicated operations would be required, inclusive of a change of the relationship between a measured data value and an opacity.

On the other hand, the conventional techniques which speed up the production of a three-dimensional image have the following problems:

In the technique described in M.Levory, "Efficient Ray Tracing of Volume Data", ACM Trans. on Graphics", vol. 1, No. 3, pp. 245–261 (1990), transparent voxels are required to be put in a hierarchical structure before production of a three-dimensional image. Thus, when display is desired while changing the opacity sequentially, the effect of speeding up the processing cannot be greatly expected. The technique of switching the resolution cannot prevent a deterioration in the quality of the whole image.

In the technique described in "Shell Rendering: Fast Volume Rendering and Analysis of Fuzzy Surface", SPIE, vol. 1653, Image Capture, Formatting and Display, pp. 35–43 (1992), volume data is required to be created for each of all the objects which are each handled as a display unit (the surfaces of a body, a bone, etc.). Thus, each time an object to be displayed is changed, much time is taken for its pre-processing.

SUMMARY OF THE INVENTION

It is therefore an object of the present invention to provide a three-dimensional image display method capable of displaying a target part of an object in the internal display using a threshold, irrespective of the relationship of the target part to the threshold.

It is another object of the present invention to provide a three-dimensional image display method capable of displaying the wall of a blood vessel in which a contrast medium has been injected in terms of the inside/outside of the wall, in an easy manner compared to the conventional techniques.

It is still another object of the present invention to provide a three-dimensional image display method capable of speeding up the production of a three-dimensional image in an easy manner without largely increasing the consumption of a storage capacity.

It is a further object of the present invention to provide devices which carry out the above respective methods.

In order to achieve the above objects, the present invention provides a thee-dimensional image producing method of projecting onto a projection plane a three-dimensional object, defined by volume data composed of a three-dimensional array of voxel data to produce an image, comprising the steps of:

inputting, to a memory, volume data of a three-dimensional array of voxel data classified beforehand into a plurality of classifications in accordance with various classification standards such as density values and parts of the object of interest;

setting positional relationship, for example, position or angle between the projection plane and the volume data in the three-dimensional space;

setting a display threshold for density;

setting at least one of the plurality of classifications as a display classification;

determining, as display candidates, voxel data of the input volume data which has a value exceeding the display threshold and voxel data of the input voxel data classified into the set display classification; and projecting the voxel data as the determined display candidate onto the projection plane.

Thus, according to the present invention, if a classification corresponding to a target part is set as a one to be displayed, the target part is displayed, irrespective of its relationship to the threshold.

In order to speed up the production of a three-dimensional image, in the present invention, a specified area having a predetermined density range is excluded from image processing to speed up same.

Voxel data is initially scanned roughly and then less roughly to locate the surface position of a target area which is subjected to image processing. The area surrounded by the surface is subjected to image processing with no other remaining area being subjected to image processing to thereby speed up the production of a three-dimensional image.

In order to permit display of the wall of a blood vessel, in which a contrast medium has been injected, in terms of the inside and outside of the wall, a plurality of neighboring voxels is subjected to edge processing which emphasizes voxels where the density changes greatly, using a deviation and differentiation. Rendering is then is performed on the basis of the volume data which has subjected to the edge processing.

DESCRIPTION OF THE PREFERRED EMBODIMENTS

Figure 1:
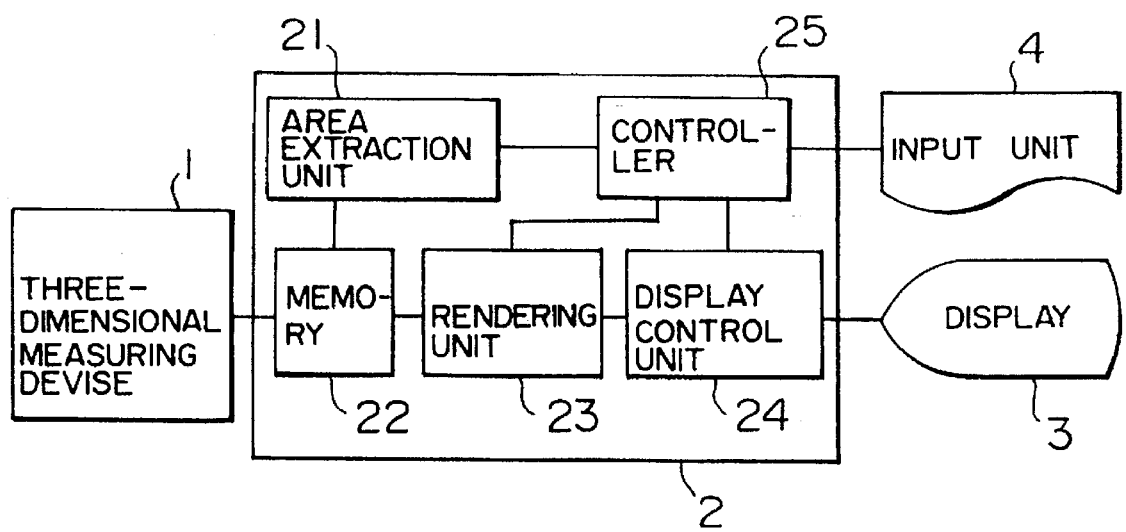
FIG. 1 is a block diagram indicative of the structure of one embodiment of a three-dimensional image producing apparatus according to the present invention.

One embodiment of a three-dimensional image producing method according to the present invention will be described with respect to the accompanying drawings. FIG. 1 shows a three-dimensional image producing apparatus according to the embodiment.

Referring to FIG. 1, reference numerals 1, 2, 3 and 4 denote a three-dimensional measuring device such as an X-ray CT device or an MRI device, a three-dimensional image producing device, a display and an input unit, respectively.

The three-dimensional measuring device 1 produces three-dimensional data or volume data by measuring a human body three-dimensionally and delivers the data to the three-dimensional image producing device 2. Voxel data representing a unit element of the volume data represents a measured X-ray absorption value in a portion of a human body corresponding to the voxel if an X-ray CT device is used whereas voxel data represents a measured value of a proton density if an MRI device is used. In the description of this specification, the voxel data value is referred to as a density.

The three-dimensional image producing device 2 is provided with a memory 22, an area extraction unit 21, a rendering unit 23, a display control unit 24, and a controller 25. The three-dimensional image producing device 2 is, in fact, a computer whereas the units 21 and 23 are functions realized by the computer.

The controller 25 displays a predetermined dialogue picture on the display 3 through the display control unit 24, and sets various parameters used in the operations of the extraction unit 21 and the rendering unit 23 in the extraction unit 21 and the rendering unit 23 in accordance with a dialogue appearing on the picture on the basis of the user's operation of the input unit 4, for example, of a mouse. That is, the controller 25 provides a graphic user interface.

Volume data delivered by the three-dimensional measuring device 1 is stored in the memory 22 of the three-dimensional image producing device 2. The area extraction unit 21 extracts data on a specified area of the volume data and stores the area data in the memory 22. The rendering unit 23 creates a three-dimensional image (in fact, a two-dimensional image) by projecting a three-dimensional shape which is represented by the volume data stored in the memory 22 onto a two-dimensional plane, and displays the three-dimensional image on the display 3. Alternatively, the rendering unit 23 may create a three-dimensional image on the basis of the area data which is produced by the extraction unit 21 or another unit and stored in the memory 22 from volume data different from the volume data used for the creation of the three-dimensional image, or on the basis of area data produced by a further measuring device such as a PET (Positron Emission Computed Tomography) device on another device or a device other than the extraction unit 21 and stored in the memory 22 on the basis of the measured values by the further measuring device.

First, the operation of the extraction unit 21 will be described below. The extraction unit 21 extracts, for example, an area of a blood vessel in which a contrast medium has been injected in the volume data, in accordance with parameters set by the controller 25 and stores information which designates that area in the memory 22. The set parameters represent a point in an area to be extracted, and a range of density of that area. The extraction unit 21 extracts an area in which a voxel in a predetermined range of density is coupled to a point set in the volume data. If necessary, an area overflowing outside the area of interest is detected and removed, for example, by reverse region growing method diffusion to determine the area with higher accuracy.

Assume that a point in the area of the blood vessel and a range of X-ray absorption degrees of the contrast medium are set as parameters to extract the area of the blood vessel.

The extraction unit 21 assigns attributes of subareas of the area to the respective voxels on the basis of the area thus extracted, and stores data on the attributes as area identification data in the memory 22. Those identification data corresponds to the area information mentioned above. The storage of the area identification data into the memory 22 is performed, for example, as follows:

A thee-dimensional data array corresponds to each of voxels of the volume data on a one-to-one basis is created as area identification data for each classification. As each of the data of the three-dimensional data array, information for that classification of the area to which a voxel corresponding to the data belongs is set. The information is different according to the classification. A code designating the classification of an area may be set as the value of data. Alternatively, the method of setting a data value may be such that each bit of the data is caused to correspond to the classification of an area and that only a bit corresponding to the classification of the area to which the corresponding voxel belongs is set at 1.

The structure and form of the area identification data may be determined in another method as long as a corresponding area in the volume data is specified for each classification.

Assume now that area identification data which designates the area of a blood vessel in the volume data has been stored in the memory 22 by the extraction unit 21.

The operation of the rendering unit 23 will be described next. First, three coordinate systems which the rendering unit 23 uses in its processing will be described.

Figure 2:
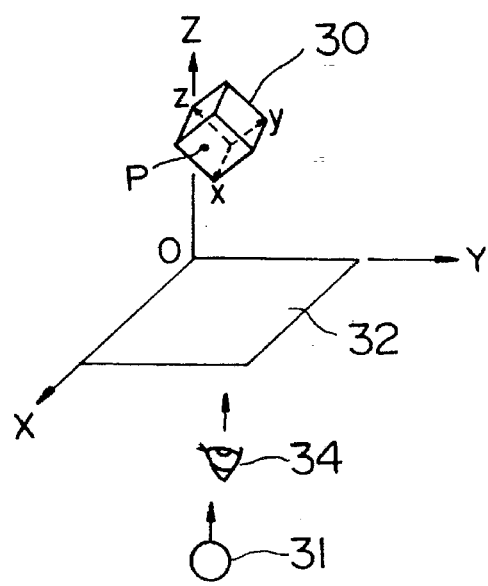
FIG. 2 illustrates the relationship between coordinate systems used by the three-dimensional image producing apparatus of the embodiment.

As shown in FIG. 2, the embodiment uses an xyz coordinate system which designates the coordinates of each voxel in the volume data 30, an XYZ coordinate system which designates a three-dimensional space in which a three-dimensional shape which the volume data represents is disposed, and a two-dimensional coordinate system which designates a point defined by coordinates on a projection plane 32. The memory 22 contains data represented by the xyz coordinate system. For clarity of explanation, in the embodiment, the X and Y axes of the XYZ coordinate system are used as the two axes of the projection plane. That is, projection planes where the magnitudes of the coordinate units are the same are disposed on the XY plane of the three-dimensional space of the XYZ coordinate system such that the origin of the three-dimensional space and the X and Y axes coincide with the origin of the projection plane and the two axes, respectively. In addition, a fixed view point 34 is set relative to the projection plane 32. A point determined by coordinates on the projection plane 32 corresponds to a respective one of voxels on the display screen of the display 3 and is referred to as a pixel for convenience' sake.

The rendering unit 23 produces an image obtained when the corresponding volume data is viewed from the view point 34, that is, an image by projecting a three-dimensional shape represented by the volume data onto the projection plane 32 in the three-dimensional space of the XYZ coordinate system.

More specifically, the rendering unit 23 first receives from the controller 25 data on the coordinates of a light source disposed in the three-dimensional space of the XYZ coordinate system, the position of the volume data in the three-dimensional space of the XYZ coordinate system, and a display threshold Fth as parameters. The controller 25 receives from the user data on the respective coordinates of the view point 34 and the light source 31 in the xyz coordinate system and calculates the positions of the volume data and the light source 31 in the three-dimensional space for the XYZ coordinate system.

The value of the density of a voxel V (x, y, z) at the position of coordinates (x, y, z) in the xyz coordinate system is represented by f.

The rendering unit 23 defines a color $q(x, y, z)=(qR, qG, qB)$ for a voxel V(x, y, z) of the volume data in the xyz coordinate system. The color is determined, for example, in dependence on a range to which the density f of the voxel V(x, y, z) belongs on the basis of the predetermined correspondence between a density range and a color. For example, the color is determined such that in a density range corresponding to a bone, the color is white whereas in a density range corresponding to an internal organ, it is red. Alternatively, other methods may be employed in the determination of a color used.

The rendering unit 23 then performs a shading process on the volume data in the xyz coordinate system. First, assume that there is a virtual surface which partitions a voxel in a place where the voxel densities change greatly. Shading is then performed on the basis of a Phong model. A normal vector N(x, y, z) representing the direction of the virtual surface is calculated on the assumption that a density difference corresponds to a gradient of the surface, using a method called a gray-level gradient, as follows:

$$N(x, y, z) = \nabla f(x, y, z)/|\nabla f(x, y, z)|$$
$$\nabla f(x, y, z) = (\{f(x+1, y, z) - f(x-1, y, z)\},$$
$$\{f(x, y+1, z) - f(x, y-1, z)\},$$
$$\{f(x, y, z+1) - f(x, y, z-1)\}).$$

The positions of the light source and the view point are calculated in the xyz coordinate system in consideration of the position of volume data given as a parameter in the three-dimensional space of the XYZ coordinate system, and the color c (x, y, z) of reflected shaded light for the shaded voxel V(x, y, z) is calculated in accordance with expression 1 below:

$$c(x, y, z) = ca \cdot ka + cl \cdot ks(\cos \phi)n + \qquad \text{expression 1}$$
$$cl \cdot kd(x, y, z) \cos \theta$$
$$= \text{environmental reflection} +$$
$$\text{specular reflection} +$$
$$\text{diffused reflection}$$

where ca is a parameter on the color of the environmental light; ka is a parameter on the reflection coefficient of the (virtual) surface to the environmental light; cl is a parameter on the color of rays of light entering from the light source to a voxel V(x, y, z); ks is a parameter on the specular reflectivity of the virtual surface; and n is a parameter on the degree of sharpness or visibility of the mirror surface reflection; those parameters being set beforehand at corresponding appropriate values; $\phi$ is the angle between the direction of regular reflection and the viewing direction; kd(x, y, z) is a diffuse reflection coefficient of the virtual surface depending on the color q(x, y, z) of the voxel; and $\theta$ is the angle between the direction of presence of the light source and the normal direction normal to the virtual surface. Actually, in order to accurately obtain the color c of reflection light from a voxel, attenuation of the light by another voxel and influence by reflection by another voxel are required to be considered, but in the embodiment the influence by those factors is ignored. As will be described later in more detail, a three-dimensional image is created on the assumption that the color c of the reflected light obtained as mentioned above is projected onto the projection plane while being attenuated by other voxels. It is empirically known that such approach produces a practically problem-free real three-dimensional image.

Figure 3:
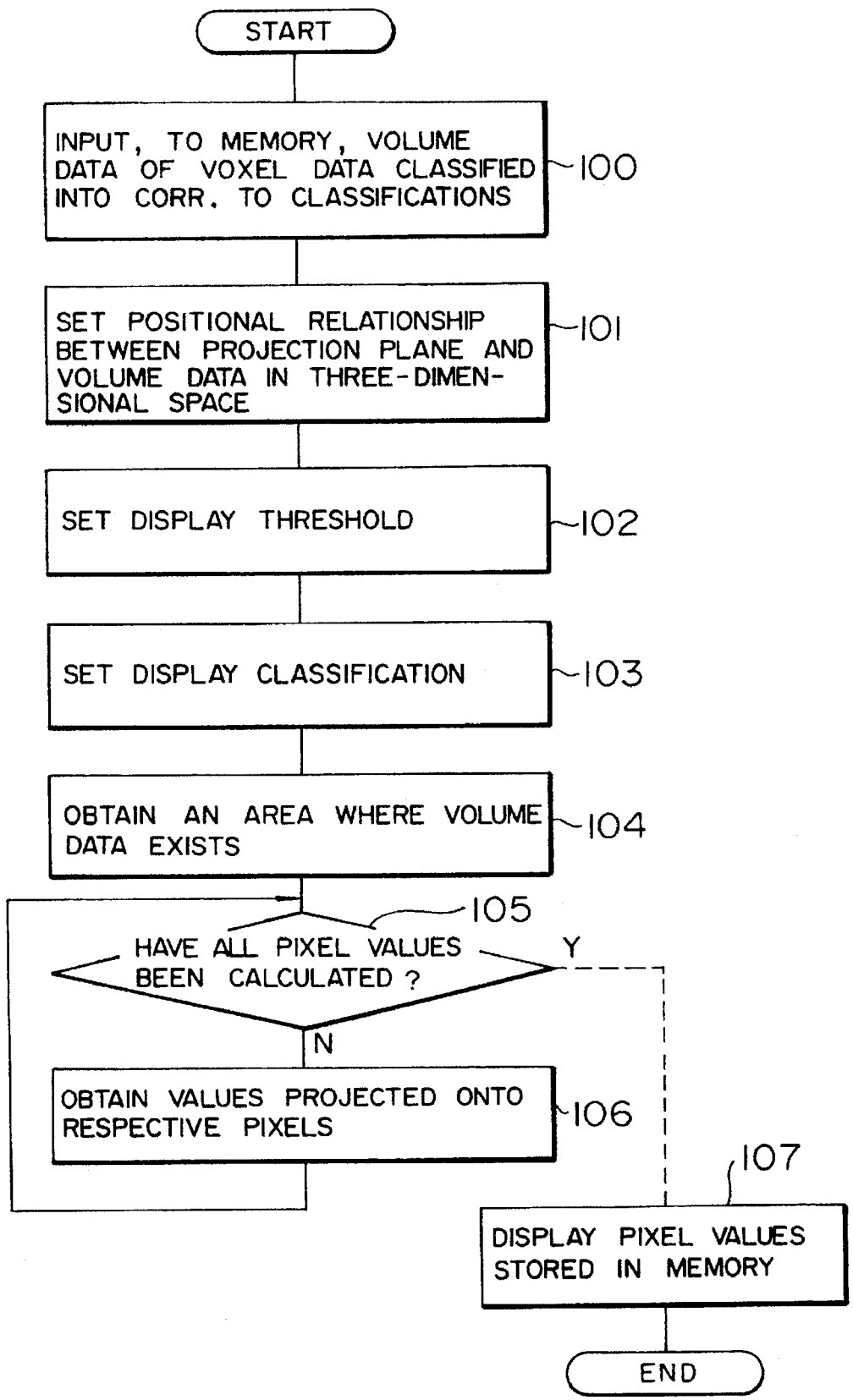
FIG. 3 is a flowchart indicative of a rendering process involved in the embodiment of the present invention.

Since the reflective light colors c of the voxels are set in the above processing, the rendering unit 23 performs a rendering process, which is shown in FIG. 3.

Volume data representing a three-dimensional array of voxel data and classified beforehand into a plurality of classifications is input to the memory (step 100). The positional relationship between the projection plane and the volume data in the three-dimensional space is then set (step 101). A display threshold is then set for density (step 102). At least one of the plurality of classifications is set as a one to be displayed (step 103).

The area which the volume data occupies when the volume data is disposed in the three-dimensional space of the XYZ coordinate system is obtained, as shown in FIG. 2 (step 104).

The values projected onto the respective pixels on the projection plane are sequentially calculated and stored in the display memory of the display control unit 24 (steps 105, 106).

The display control unit 24 is then instructed to display the image constituted by the respective pixel values stored in the display memory to thereby terminate the processing (step 107). The instructed display control unit 24 displays on the display 3 the image constituted by the respective pixel values stored in the display memory.

The details of calculation of the pixel value at step 106 and storage of the pixel value in the memory will be described next with respect to FIG. 4. This involves as an example a case in which an area identified with the area identifying data produced as the area information by the extraction unit 21 is processed as an extraction one. As described above, the area information may be other than the area identification data which the extraction unit 21 has generated.

In this processing, rays of light are advanced by one coordinate at a time from a pixel on the projection plane whose pixel value is to be calculated at step 106 toward the volume data in a direction normal to the projection plane (in FIG. 2, in a direction parallel to the z axis toward the volume data)(in FIG. 2, the z coordinate is advanced by one).

First, the controller 25 sets at 1 the initial value of the transmittivity parameter which represents a rate of transmission at which part of the rays of light passing through the voxel disposed at coordinates and reflected by the voxel through which the rays of light is passing transmits to the projection plane, which implies that the rays of light pass completely without attenuation. An extraction area memory, an outside-extraction-area memory and an extraction area pass flag to be used in the subsequent processing are set at 0 (step 201).

After the rays of light emitted from the pixel are advanced until they impinge on the point P(x, y, z) obtained at step 104 in an area where the volume data exists, a transmittivity for a respective one of the voxels is calculated on the basis of an opacity beforehand allocated to that voxel. It is then determined whether the transmittivity parameter is substantially equal to 0 (step 202). If so, it is determined that no rays of light pass through the voxel. Control then passes to step 213. If not at step 202, control passes to step 203, where it is determined whether the rays of light emitted from the pixel have passed through an area where the volume data obtained at step 104 exists. If so, control passes to step 213. If otherwise, control passes to step 204.

At step 204 the coordinates of a point P(X, Y, Z) in the area of existence of the volume data obtained at step 104 and where the rays of light emitted from the pixel impinge are subjected to movement-rotation transformation to the x, y and z coordinates of a point p.

At step 205 the controller determines whether the transformed point p(x, y, z) is a one in the area extracted by the extraction unit 21 on the basis of the area identification data in the memory 22 (step 205). If so, an extraction area passage flag is set at 1 and control then passes to step 207.

If not at step 205, the controller determines whether the extraction area passage flag is 1 (step 210). If so, the controller determines that the processing for the appropriate pixel has ended. Thus, control passes to step 213. If not at step 205, the controller calculates the density of the transformed point p(x, y, z) to calculate the influence of a voxel outside the area of interest on the pixel. The calculated density is handled as the density F of the point P(X, Y, Z). The density f of the transformed point p(x, y, z) outside the extracted area is calculated by interpolation from the densities of its peripheral voxels. For example, assuming that (1) the coordinates of a point P(X, Y, Z) are subjected to movement-rotation transformation to become coordinates (x, y, z)=(0,½, 0), (2) the density f of a voxel at the coordinates (x, y, z)=(0, 1, 0) is ¼, and (3) the density f of a voxel at the coordinates (x, y, z)=(0, 0, 0) is ¾, the point p(x, y, z) overlaps perfectly with the point P(X, Y, Z). Thus, f=F=½. That is, F=2/4 is employed. The controller determine whether the calculated density is higher than the display threshold Fth set as the parameter (step 211). If not, the controller determines that the voxel of interest should not be displayed, advances by one coordinate the rays of light emitted by the pixel present on the projection plane. Control then returns to step 202, where the controller performs the processing for the next point.

If the calculated density is higher than the display threshold Fth, it determines that the voxel is to be displayed. Thus, control passes to step 207, where the controller calculates a quantity Q of influence of the point P(X, Y, Z), through which the rays of light emitted from the pixel present on the projection plane are advancing at present, on the pixel on the projection plane. The details of the calculation will be described later. At step 208 the quantity of influence Q calculated inside the extraction area is added to the data in the extraction area memory whereas at step 212 the quantity Q calculated outside the extraction area is added to the data in the outside-extraction-area memory. At step 209 the transmittivity of rays of light to a voxel next to the voxel for which the quantity of influence has just now been calculated is calculated as a new transmittivity parameter. The rays of light are then advanced by one coordinate. Control then returns to step 202, where the controller performs required processing for the next point.

As the result of the processing at steps 202, 203, 205 and 211, only the point in the area extracted by the extraction unit 21 and points having densities exceeding the display threshold Fth among the points calculated at step 104 in the area where the volume data exists are processed sequentially at steps 207, 208 and 212. The points at the back of the area extracted by the extraction unit 21 in the processing at steps 206 and 210 are not subjected to the processing.

The points at the back of the points where the transmittivity parameter is substantially 0, which implies that few rays of light pass through the points as the result of the processing at step 202 are also not subjected to the processing at steps 207, 208 and 212. This is because even when a few rays of light pass through the points, the reflection from the voxels at the back of those points is attenuated, hence substantially does not reach the projection plane, and does not substantially influence the pixel value on the projection plane.

At step 207, the controller calculates a quantity of influence Q of the point P(X, Y, Z), through which the rays of light emitted from the pixel present on the projection plane pass at present, onto the projection value on the pixel on the projection plane.

Figure 5:
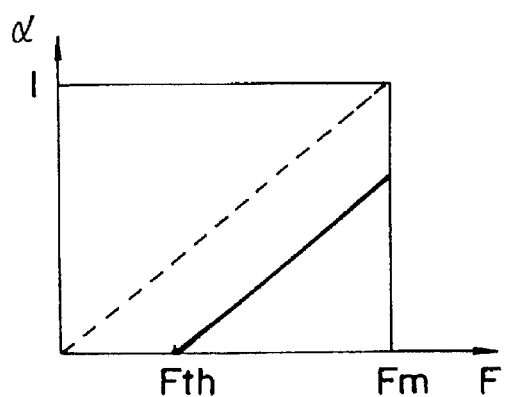
FIG. 5 shows the relationship between a density and an opacity used in the embodiment of the present invention.

More particularly, first, an opacity $\alpha$ ($0 \leq \alpha \leq 1$) is defined at the point P(X, Y, Z) in accordance with the density F of the point P(X, Y, Z). As shown in FIG. 5, the opacity is set such that the opacity $\alpha$ is 0 from the origin 0 to the display threshold Fth set as the parameter and increases linearly as the density increases from the threshold Fth to the maximum possible value Fm of the density. The gradient of the opacity graph (shown in a solid line) is predetermined so as to be the same as that of a reference graph (shown in a broken line) in which as the density increases from a minimum density 0 to the maximum density Fm, the opacity $\alpha$ increases linearly from 0 to become 1 at the maximum value Fm.

For a point P(X, Y, Z) outside the area extracted by the extraction unit 21, its coordinates are transformed to those in the xyz coordinate system as in the case of the density value calculation. The color C(X, Y, Z) of the point P(X, Y, Z) outside the area is then calculated by trilinear interpolation on the basis of the color c(x, y, z) of a peripheral virtual surface of the point P (X, Y, Z) in the volume data.

The color C(X, Y, Z) of the point P(X, Y, Z) in the area extracted by the extraction unit 21 is a predetermine one. Alternatively, it may be and calculated from the corresponding volume data in the xyz coordinate system like the density value. If the opacity $\alpha$ is fixed at 1, the extraction area flag and the processing at steps 206 and 210 are unnecessary.

Assume that in each voxel the opacity $\alpha$ is equal to the reflectivity, that the transmittivity of rays of light is ($1-\alpha$), and that the rays of light reflected by the voxels disposed at the respective points pass through other voxels disposed before the projection plane at their transmittivity to arrive at the projection plane. In this case, a quantity of influence Q of the projection value is calculated in accordance with the following expression 2:

$$Q_{(i)} = \alpha_{(i)} \cdot c_{(i)} \prod_{j=1}^{i-1} (1-\alpha_{(j)}) \qquad \text{expression 2}$$

where i denotes an ith point to be processed at present and hence (i-1)th point denotes the one processed last, at step 207.

In this expression, the term $\Pi (1-\alpha_{(j)})$ is the product of the respective transmittivities of the voxels disposed between the point i and the projection plane and represents the transmittivity of the rays of light $\alpha_{(i)}.c_{(i)}$ reflected by the voxel at the point i to the projection plane. Thus, at step 209, the product of the term $\Pi (1-\alpha_{(j)})$ and the term $\alpha_{(i)}.c_{(i)}$ is used as a new transmittivity parameter at the next point. That is, the term $\Pi (1-\alpha_{(j)})$ of expression 2 is equal to the value of the transmittivity at that time.

In summary, the respective influence values of the voxel data determined as display candidates projected onto the projection plane are calculated as temporary projection values $Q_{(i)}$ on the assumption that the display candidate voxel data have optical characteristics depending on their respective influence values. The sum of the respective projection values of the display candidate voxel data projected onto each of the points on the projection plane is handled as a pixel value on the projection plane.

At step 208 the sum of the influences $Q_{(i)}$ obtained for a point in the extraction area is stored in the corresponding memory whereas at step 212 the sum of the influences $Q_{(i)}$ obtained for a point in the outside-extraction area is stored in the corresponding memory.

After the projection values, onto the projection plane, of the respective voxels disposed on the optical path of rays of light emitted from one pixel present on the projection plane are obtained in the above manner for each of the influence of the points inside the area and the influence of the points outside the area, at step 213 the controller determines which of the sum of the influences $Q_{(i)}$ in the extraction area and that in the outside-extraction area is larger, and stores the larger one as the final pixel value in the display memory.

Since one pixel value on the projection plane has now been obtained, control returns step 105 of FIG. 3, where a similar operation is iterated until the pixel values are obtained for all the pixels.

While in the above the rendering unit 23 has obtained the values of the respective pixels on the projection plane by application of a volume rendering technique, another technique such as surface rendering which projects only voxels closest to the projection plane onto the corresponding pixels present on the projection plane thereby obtain the pixel values.

The display of a three-dimensional image performed on the basis of pixel values obtained by setting the display threshold at various values will be described below.

Figure 6A:
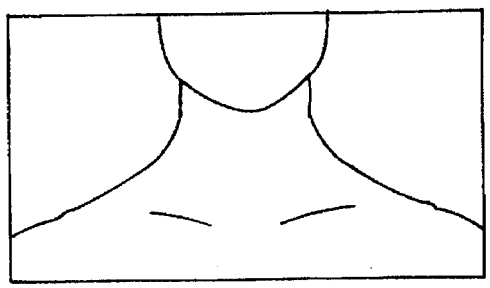
FIGS. 6A and 6B each show an example of a three-dimensional image produced in the embodiment of the present invention.

FIG. 6A shows the display of a body surface (skin) obtained when the display threshold is set at a lower value. When the display threshold is at a lower value, the body surface of a lower density becomes an object which is to be subjected to the processing at step 207 and the projection value of a body surface portion closer to the projection plane onto a pixel on the projection plane is larger than that of the blood vessel extracted by the extraction unit 21 onto the pixel of the projection plane. Thus, by the processing at step 213, the projection value of the body surface is selected and displayed.

Figure 6B:
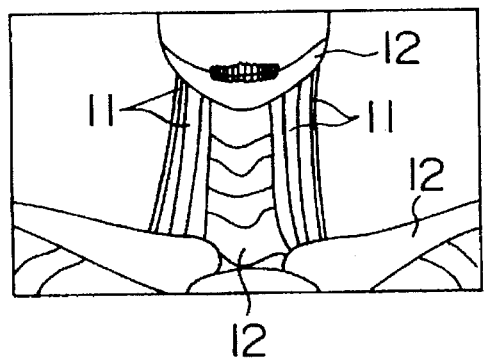

FIG. 6B illustrates the display of a body obtained when the display threshold is set at the lowest one of the densities of the bones. The density value of the bones and skeleton 12 is higher than the display threshold, so that it is displayed.

The blood vessel 11 has a density lower than the display threshold, but it is in the extraction area. Thus, it is displayed. The skin is not displayed because its density is lower than the display threshold.

As described above, in the present invention, the blood vessel having a lower density than the display threshold is displayed along with the bone.

While in the processing the area extracted by the extraction unit 21 has been handled as a one to be displayed irrespective of the relation of its density to the display threshold in addition to the voxels having densities higher than the display threshold, conversely, the area extracted by the extraction unit 21 may be excluded from a one to be displayed irrespective of the relationship of its density to the display threshold. Display/non-display of an area extracted by the extraction unit 21 is preferably performed in dependence on that area. For example, any particular one of a plurality of areas extracted by the extraction unit 21 may be to be handled as an object to be displayed irrespective of the threshold whereas another area may be handled as a one which is not to be displayed irrespective of the threshold.

An area extracted by the extraction unit 21 may be displayed in a predetermined specified color. For example, at step 208 of FIG. 4 the values of influence of the points may be converted to other values, which are then written into the extraction area memory. In this conversion, it is to be noted that no brightness should be changed.

Figure 4:
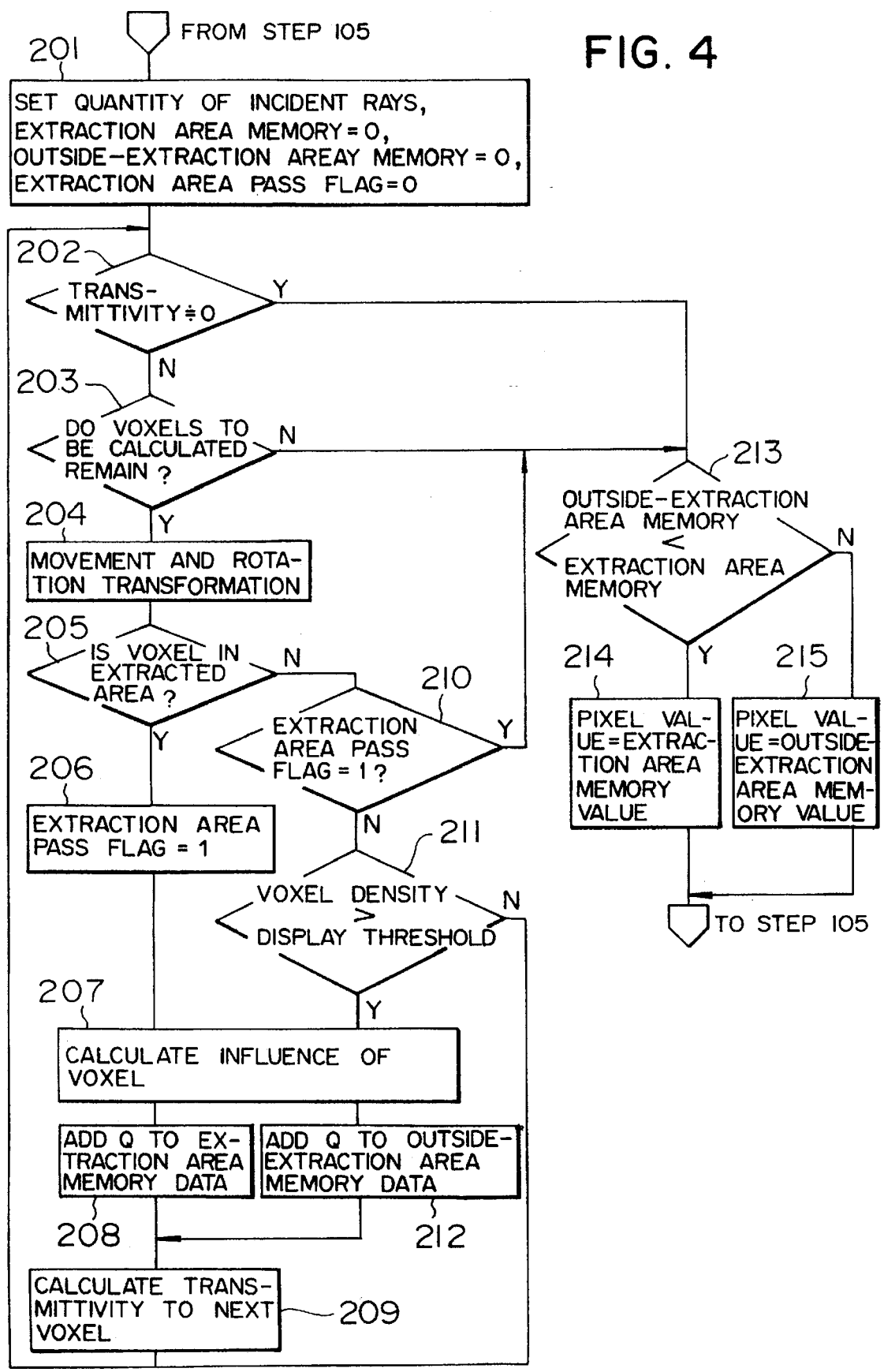
FIG. 4 is a flowchart indicative of a projection value calculating process involved in the embodiment of the present invention.

Alternatively, the controller 25 may determine at step 205 of FIG. 4 whether the density of a voxel is within the range of densities of voxels in an area to be extracted without an area of interest being beforehand extracted by the extraction unit 21. If so, the controller may determine that the voxel is a one in the extraction area.

As described above, a large amount of data, inclusive of a large amount of volume data, is required to be processed in order to produce such three-dimensional image.

In order to omit the calculation of as many areas as possible where no object to be displayed exists to speed up the production of a three-dimensional image, in the present embodiment, the processing at step 104 of FIG. 3 for obtaining an area where the volume data exists is executed as follows.

Figure 7:
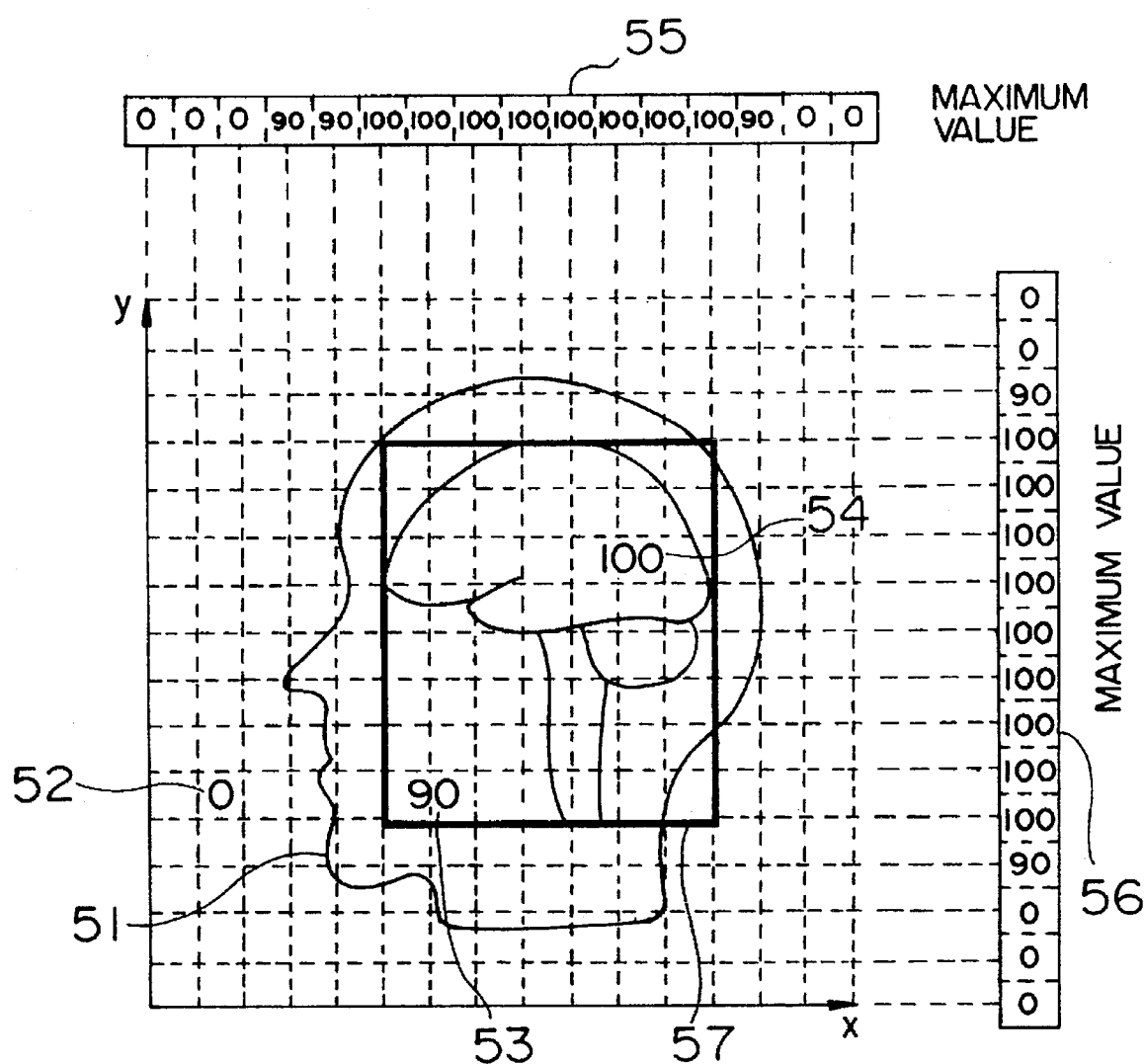
FIG. 7 illustrates a process for determination of a volume data presence area performed in the embodiment of the present invention.

FIG. 7 shows the display of a brain based on volume data on a head.

First, the rendering unit 23 scans the volume data in the x, y and z coordinate system in the directions of the respective x, y and z axes to detect the maximum value of the densities of the voxels on a plane perpendicular to a respective one of the axes and stores the maximum value in the memory. For example, for x=m, the maximum value of the densities of the voxels on a plane at x=m is stored.

FIG. 7 shows a plane at z=k as an example. FIG. 7 shows that the maximum ones of the density values at the respective x and y coordinate values are obtained, and stored in the x and y maximum memories 55 and 56, respectively. Actually, in addition to those memories, a z maximum value memory is used.

The illustration of FIG. 7 is based on the assumption that the densities of the voxels 52, 53 and 54 in an area where no objects exist, a head area except for the brain and a brain area are uniformly 0, 90 and 100, respectively.

Assume now that the value "90" is set as a display threshold for display of the brain. The rendering unit 23 then scans the three maximum memories from their respective opposite ends to find ranges where the densities exceed 90 and determines a cuboid space composed of a voxel contained in the respective found ranges of x, y and z as an area where the object to be displayed exists. In FIG. 7, a range 57 is obtained for x and y.

The coordinates of the vertexes of the cuboid space are moved into and rotation-converted in the XYZ coordinate system on the basis of the positional relationship between the volume in the xyz coordinate system and the projection plane in the XYZ coordinate system, and the resulting cuboid space is handled as an area where the volume data to be processed exists.

By specifying the area where the volume data exists, as just described above, an area except for the one where the object to be displayed exists is excluded from the object to be processed at step 106 of FIG. 3 (the processing in FIG. 4) to speed up the three-dimensional image production.

While in many cases, usually, the production of a three-dimensional image is performed repeatedly by changing the display threshold and the viewpoint (the disposition of volume data into the three-dimensional space of the XYZ coordinate system), the contents of the three maximum value memories are inherent in the volume data, so that they can be used repeatedly if they are produced once.

As described above, when an area identified with the area identification data on the area extracted by the extraction unit 21 and an area where the density exceeds the display threshold are displayed in combination, the area identification data in the memory 2 is required to be referred to and the corresponding data is required to be added to the cuboid space in the process for obtaining the area where the volume data exists in the three-dimensional space. Alternatively, as in the display threshold, a cuboid space where an area identified by the extraction unit 21 exists may be obtained and added to the cuboid space. Alternatively, a minimum cuboid may be obtained which includes the area extracted by the extraction unit 21 and an area where a voxel having a density higher than the display threshold exists.

The processing at step 104 of FIG. 3 for obtaining the area where the volume data exists may be performed in place of the processing mentioned above or in combination of the above processing to speed up the production of the three-dimensional image. For example, when the area of the brain is to be obtained, first, an area containing the brain may be scanned coarsely to obtain points close to the brain surface. Then, the brain is scanned less coarsely to locate the area of the brain surface.

Figure 8:
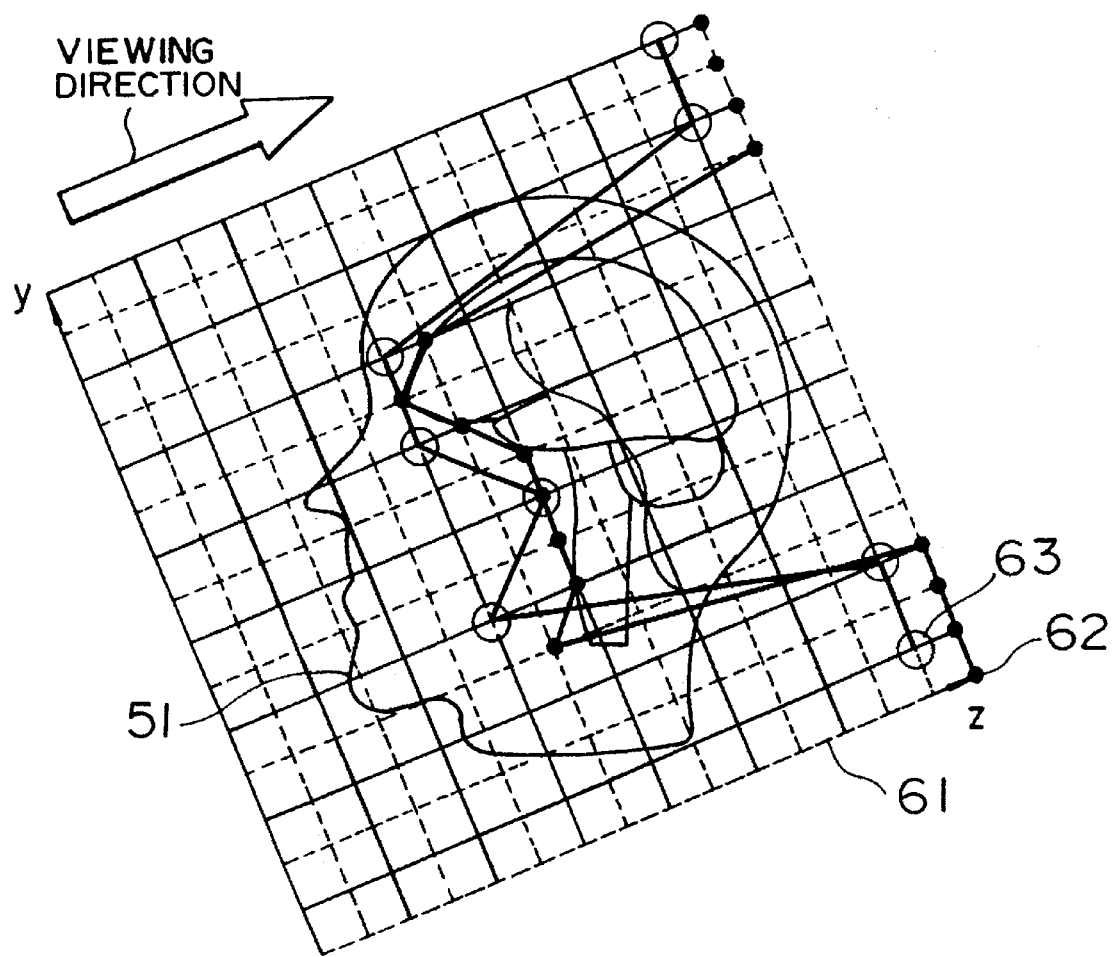
FIG. 8 illustrates another process for determination of a volume data presence area performed in the embodiment of the present invention.

More specifically, the rendering unit 23 coarsely scans coordinate points, in the area where the volume data exists in the three-dimensional space of the XYZ coordinate system, obtained using the data in the maximum value memories, in the direction of the eyes to locate the position (hereinafter referred to as the surface) of the area to be displayed and closest to the projection plane to speed up the processing. This will be illustrated as an example of searching a brain surface in FIG. 8 involving a cross-section at X=a in FIG. 2. The Y axis of FIG. 8 shows a line x=a on the projection plane. The intersections (shown by solid lines), on the projection plane, of lines extending through every second coordinates (X, Y) in the Y axis and parallel to the Z axis and lines extending through every second coordinate in the direction of the Z axis or eyes and parallel to the Y axis are converted to points in the xyz coordinate system. The densities of voxel data at those intersections are each calculated from densities of the environmental voxel data by the three-dimensional linear interpolation, as mentioned above. Alternatively, the density of the lattice point coordinates (x, y, z) nearest that intersection may simply be used as the density of the voxel at those coordinates. When the processing at the cross-section at X=a has been completed, a similar processing should be performed also at every second coordinate position in the X axis direction.

Data on the Z coordinate of a coordinate point where the density obtained for a set (X, Y) has first exceeded the display threshold is stored as the z coordinate on the surface for the (X, Y) in the surface memory. For example, assuming now that the display threshold for display of the brain is set at 90 (FIG. 7), a voxel having a density value higher than 90 is selected and data on X, Y and Z coordinates (white dots in FIG. 8) on an approximate surface of the brain coarsely obtained is stored in the display memory, as shown in FIG. 8.

In order to perform a scan in less coarse intervals, the rendering unit 23 scans coordinate points around the respective points (the intersections of the solid lines and intersections of the broken lines of FIG. 8) on the approximate surface, converts those coordinate points to those in the xyz coordinate system and calculates the density of the voxel data at each of those coordinates, using a trilinear interpolation, from the densities of the voxel data around that coordinate point, as described above. The point where the density of the voxel exceeds the display threshold (black dots in FIG. 8) is located for each (X, Y) and the obtained (X, Y, Z) coordinates are stored as representing a final surface in the display memory.

The rendering unit 23 handles that portion of the area where the volume data exists in the three-dimensional space of the XYZ coordinate system, obtained using data in the maximum memories, and which is present at the back of the obtained final surface position, as the area where the volume data exists in the three-dimensional space of the XYZ system.

As described above, when the area identified by the extraction unit 21, etc., and an area where the density exceeds the display threshold are displayed in combination, the area identification data in the memory 22 is required to be referred to and the point in the area identified by the extraction unit 21, etc., is required to be handled as a one whose density exceeds the display threshold, in the process which obtains the area where the volume data exists in the three-dimensional space.

Figure 9:
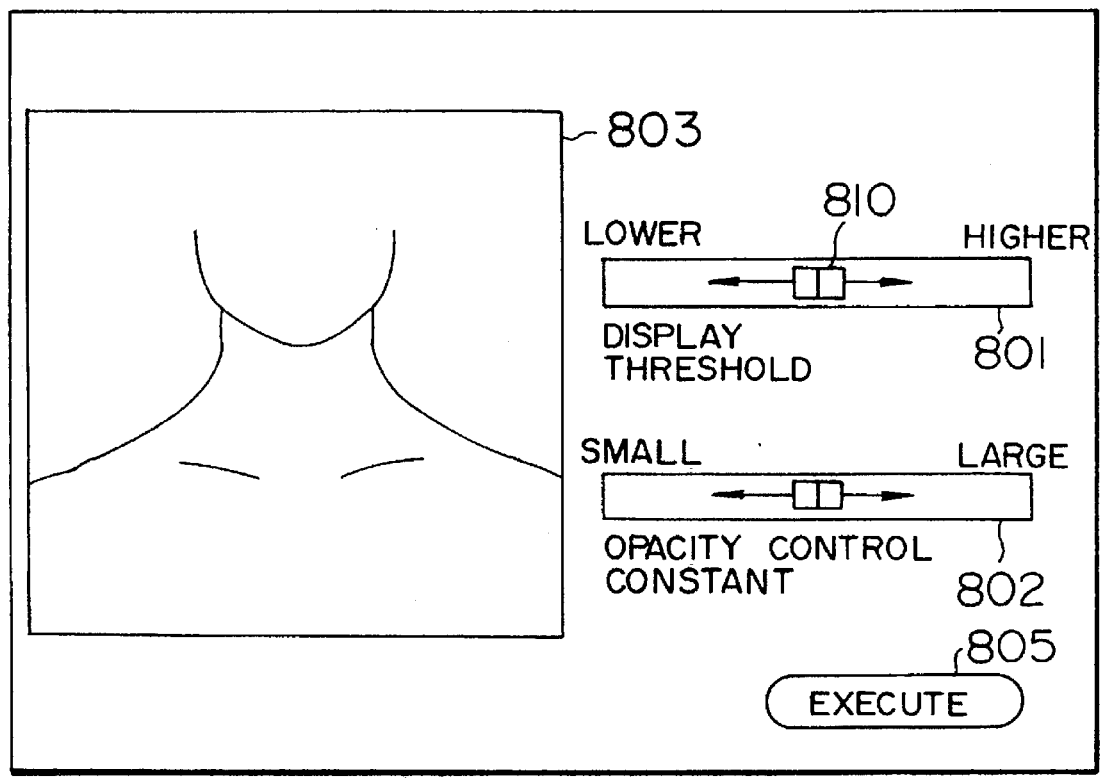
FIG. 9 shows a picture displayed by the three-dimensional image producing apparatus acceding to the embodiment of the present invention.

As described above, in many cases, the production of a three-dimensional image is usually performed repeatedly while changing the display threshold and the viewpoint (the disposition of volume data in the three-dimensional space of the XYZ coordinate system). The controller 25 of the three-dimensional image production device 2 displays on the display 3 graphics 801 which accepts a change of the display threshold along with the produced three-dimensional image 803, an execution icon 805 which receives instructions to produce a three-dimensional image, and graphics 802 which receives a change of an opacity control constant to be described later, in a form shown in FIG. 9.

The graphics 801 is an image simulating a slide volume. The user moves a handle 810, for example, with a mouse as an input unit 4 to change the threshold. As the handle 810 is moved rightward, the display threshold increases while the handle 810 is moved leftward, the display threshold decreases. When the execution icon 805 is selected by the mouse, the controller 25 gives a display threshold depending on the position of the handle 810 as a parameter to the rendering unit 23 to instruct same to produce a three-dimensional image. By using such graphic user interface, the user can designate a display threshold sensuously and continuously.

There are cases where the produced three-dimensional image does not clearly express an object which the user desires to observe, even if the user changes the display threshold again to produce a three-dimensional image; for example, when there are tissues having a high density before the area of interest or when fine blood vessels having a low density are desired to be displayed.

In such a case, if the opacity is changed appropriately to thereby produce a three-dimensional image again, the object which the user desires to observe is expressed clearly. However, it is troublesome to set an appropriate density for each tissue. Actually, it is difficult for the user to immediately grip appropriate setting.

In the processing by the rendering unit 23, the degree of display of the object which the user desires to observe may be changed in accordance with a set changeable opacity control constant like the display threshold by determining the transmittivities of light in the respective voxels, using the opacity control constant, in the graphics 802.

As mentioned above, in the processing at step 207 of FIG. 4, the opacity $\alpha$ is determined such that it is 0 when the density is between 0 and the display threshold Fth set as the parameter, increases linearly at a predetermined gradient when the density increases from the display threshold Fth to the maximum Fm, as shown in FIG. 5, with the opacity $\alpha$ being determined as the reflectivity of light and (1–$\alpha$) being determined as the transmittivity of light.

These set values are changed as follows. First, the density $F_{(i)}$ of a point i is normalized with the difference between the maximum possible density value Fm and the display threshold Fth to produce a normalized density $Fnl_{(i)}$ given by $$Fnl_{(i)} = (F_{(i)} - Fth)/(Fm - Fth).$$

Figure 10:
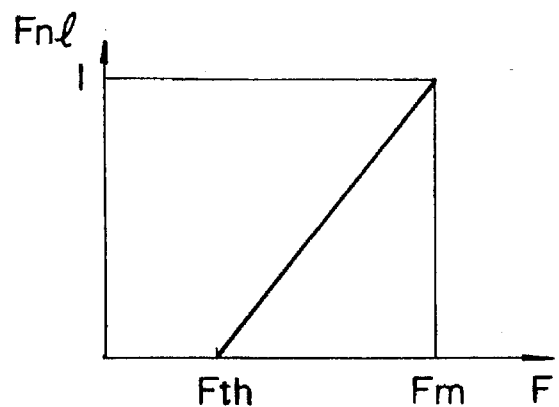
FIG. 10 shows the relationship between density and normalized density used in the embodiment of the present invention.

Thus, the relationship between density and normalized density is shown in FIG. 10.

The normalized opacity is handled as a reflectivity and a transmittivity =1-op·$Fnl_{(i)}$ is used where op is an opacity control constant. It is to be noted that $0 \leq$ op and that when the transmittivity is $\leq 0$, the transmittivity is handles as 0.

Thus, the influence of an ith voxel of expression 2 on the pixel value on the projection plane is rewritten as shown in expression 3 below in consideration of the influence of the ith voxel and the (i–1) voxels present on the projection plane:

$$Q_{(i)} = Fnl_{(i)} \cdot c_{(i)} \prod_{j=1}^{i-1} (1 - Fnl_{(j)} \cdot op) \qquad \text{expression 3}$$

In summary, when the rays of light $Fnl_{(i)} \cdot c_{(i)}$ reflected by a respective one of the voxels determined as the display candidates at its set reflectivity in the three-dimensional space pass through other display candidate voxels at their set transmittivities $(1-Fnl_{(i)} \cdot op)$ to be projected onto a point on the projection plane having a set positional relationship to the volumes, the resulting value of the influence is obtained as a temporary projection value $Q_{(i)}$ at that point on the projection plane.

The sum of the respective temporary projection values obtained for the respective display candidate voxel data projected onto the respective points on the project plane is handled as a pixel value on the projection plane.

The product of the normalized opacity and the opacity control constant op may be handled as a reflectivity.

Figure 11:
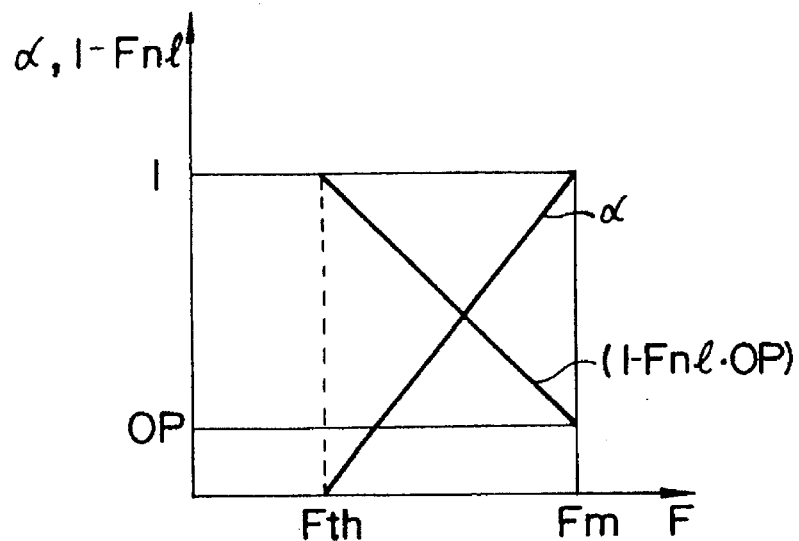
FIG. 11 shows the relationship between density and reflectivity, transmissivity used in the embodiment of the present invention.

By doing so, a whole usable range of 0–1 is usable as an opacity or reflectivity of each voxel exceeding the display threshold. As the op is changed, the gradient of a straight line (1–Fnl·op) changes, so that any range of any value to 1 may be used as the tranmittivity of each voxel exceeding the display threshold Fth. FIG. 11 shows the relationship between density F and reflectivity α, transmittivity (1–Fnl·op) where the reflectivity α and the transmittivity (1–Fnl·op) are shown as having the same scale along the axis of coordinate.

As described above, since a wide range of 0–1 may be used as the reflectivity α compared to FIG. 5, a produced image has a clearer contrast. A transmittivity corresponding to the density of a voxel can be set at any value, using the opacity control constant op alone. For example, even when there is a voxel having a higher density or reflectivity before the voxel to be displayed, the structure of the voxel to be displayed at the back of the voxel having that high reflectivity is displayed as the transmittivity increases. Conversely, even when the object to be displayed (for example, fine blood vessels having a lower reflectivity) has a lower reflectivity, it is displayed by reducing the opacity control constant op and the transmittivity thereof.

The processing at step 207 of FIG. 4 may be changed without an opacity control constant. In the processing at step 207 of FIG. 4, the opacity α is first determined, as shown in FIG. 5, such that it is 0 when the density is between 0 and the display threshold Fth set as the parameter, and that it increases linearly from 0 at a predetermined gradient when the density increases from the display threshold Fth to the maximum density Fm with the opacity α being determined as the reflectivity of light and the (1–α) being determined as the transmittivity of light. This processing is changed as follows.

Figure 12:
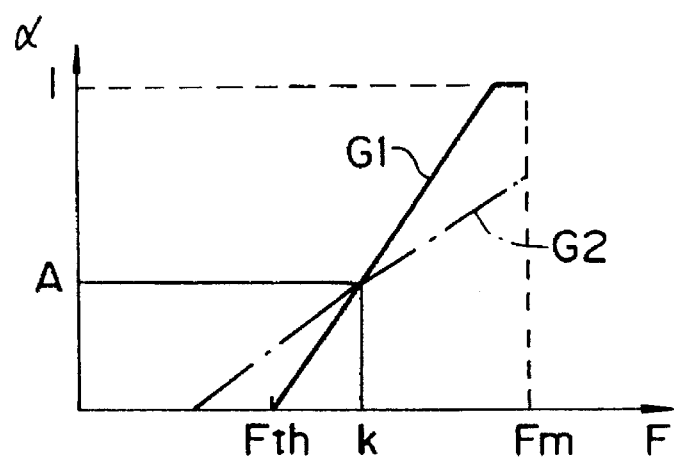
FIG. 12 illustrates a technique for determination of the relationship between density and opacity performed in the embodiment of the present invention.

In this processing at step 207 of FIG. 4, no opacity control constant is used. Since the gradient representing the relationship between the opacity α and the density is constant when the densities is between the display density threshold value Fth and the maximum value Fm, the opacity α corresponding to the density changes as the display threshold changes. In contrast, when only the display of tissues other than a particular one is to be changed, the controller 25 receives from the user the designation of the density k of the particular tissue and determines the relationship between opacity α and density k such that even when the display threshold Fth changes, the opacity A corresponding to the density k does not change, that is, that α=A at all times irrespective of density k, as shown by straight lines G1 and G2 in FIG. 12. In this case, display of unnecessary blood vessels is avoided by changing a set threshold Fth without changing the display of a target bone having a density k.

In the three-dimensional image producing process, as mentioned above, blood vessels containing a contrast medium can be displayed externally, but the inside of a blood vessel viewed from an internal view point cannot be displayed because the contrast medium before the inside wall of the blood vessel is high in density or opacity and reflectivity and low in transmittivity compared to the blood vessel; and the area outside the blood vessels is low in density or opacity and reflectivity, and high in transmittivity compared to the blood vessels.

Figure 13:
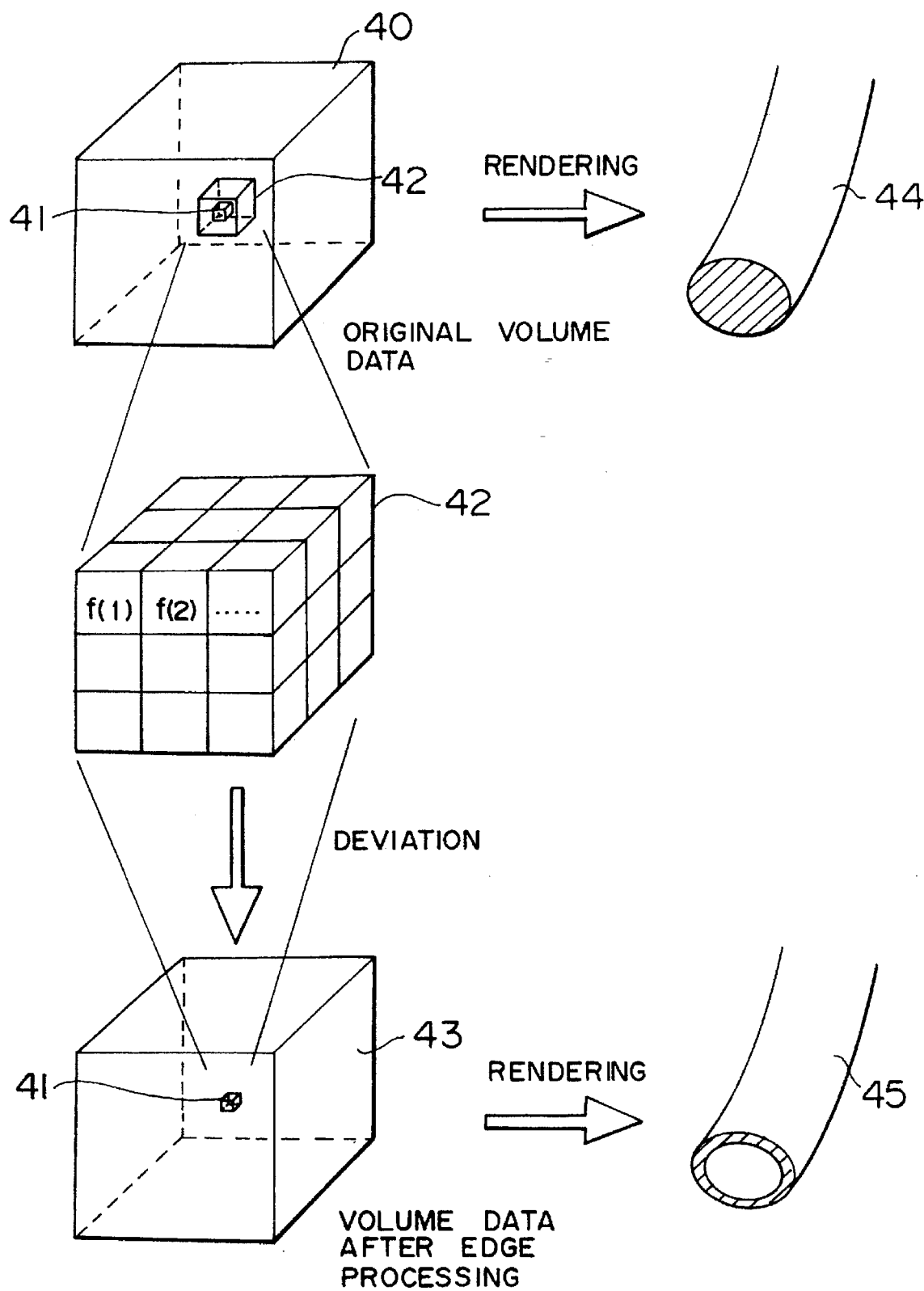
FIG. 13 illustrates edge emphasis performed in the embodiment of the present invention.

In such a case, by changing the respective settings, inclusive of the reversal of the relationship between the density and the opacity to thereby produce a three-dimensional image, the inside wall of the blood vessel is displayed. Setting of the density and opacity is troublesome and difficult for the user to perform. In order to conquer such situation, the densities of the respective voxels of the volume data may be changed as follows. A voxel collection 42 composed of a particular voxel 41 and twenty six other nearby voxels of volume data 40 of FIG. 13 is taken out. A deviation of the density of the voxel collection 42 is calculated in accordance with the next expression 4:

$$\left\{ \sum_{i=1}^{27} \left( f_{(i)} - \left( \left( \sum_{j=1}^{27} f_{(j)} \right) / 27 \right) \right)^2 / 27 \right\}^{1/2} \qquad \text{expression 4}$$

where $f_{(1)}, f_{(2)}, \ldots,$ and $f_{(27)}$ are the densities of the respective voxels.

The obtained deviation value is normalized with an appropriate value such that a set of respective deviation values of voxels has an appropriate range (which, for example, is the same as the density range). New volume data 43 is calculated with the normalized deviation value as a new density of the voxel 41.

Edge processing which emphasizes an area where the density changes greatly, using the deviation, is performed on the volume data. Alternatively, edge processing may include differentiation, but edge processing which includes the use of the deviation is preferable because less noise is involved. The number of voxels which each take a deviation is not required to be 27. For example, the number of adjacent voxels may be 6, or conversely, more than six voxels may be used. As the number of voxels which each take a deviation increases, the effect of smoothing the edge processing increases.

The voxel data of the volume data having a value exceeding the display threshold and having been subjected to edge emphasis is determined as display candidates.

Without edge processing, only the outside of the blood vessel 44 (only the inside of the blood vessel when the correspondence between the density and the opacity is changed) is displayed because the original volume data 40 corresponds to a blood vessel full of a contrast medium. However, the volume data 43 which has been subjected to edge processing corresponds to a blood vessel having its wall alone (or containing no contrast medium), so that the blood vessel 45 is displayed both externally and internally.

In this case, the density of the original voxel cannot be known and the relationship between the classification and density of the tissue is lost. To avoid this situation, the product of the density of the original voxel and the deviation may be used as a new density for the voxel. In addition, the voxel may have information on its tissues. By doing so, an object to be displayed may be changed for each kind of tissue in dependence on its display threshold. The sum of the deviation and the density of the original data may be used as a new density for the voxel. Alternatively, the extraction of a voxel to be displayed using a display threshold may be performed on the basis of the original volume data and calculation of the projection value of the voxel to be displayed onto the projection plane may be performed on the basis of new volume data having a deviation as its density.

Figure 14:
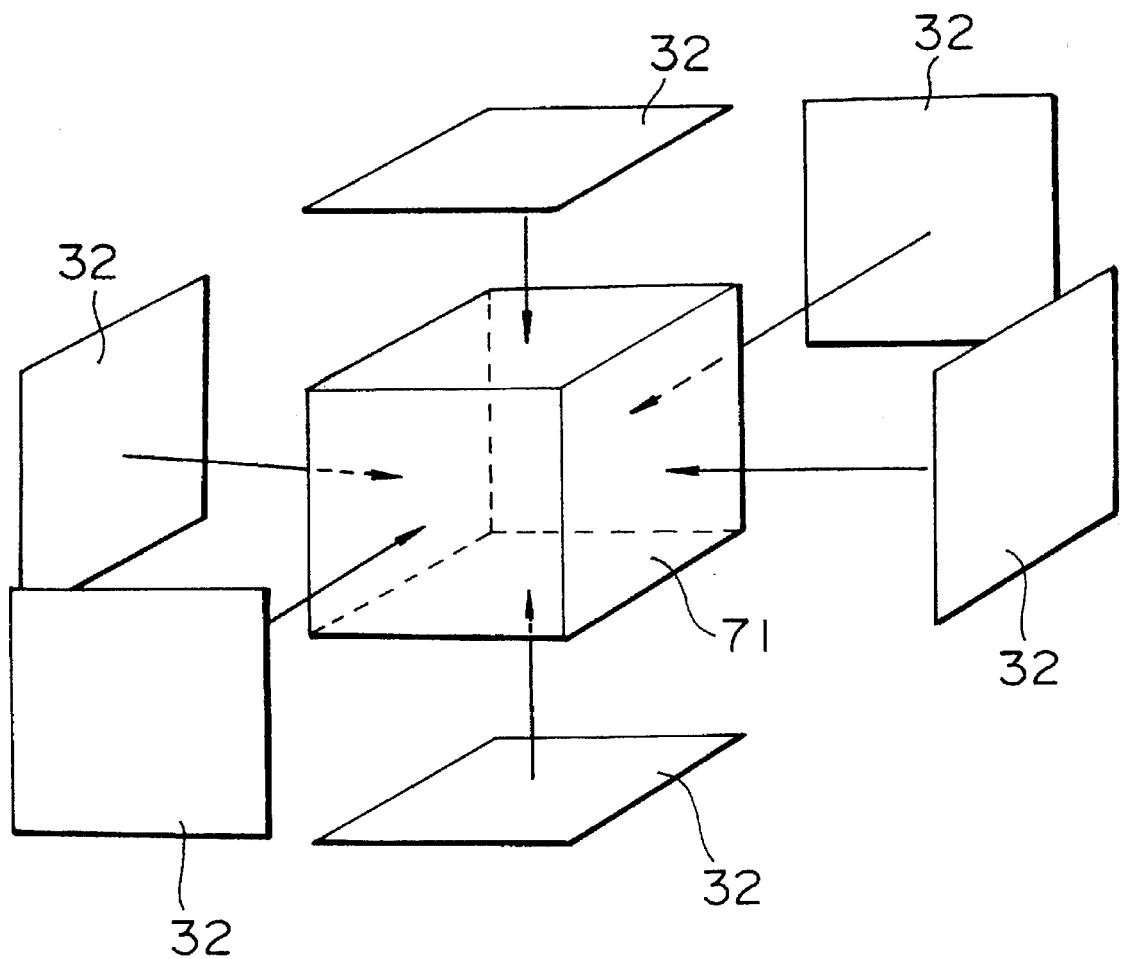
FIG. 14 illustrates the limitation of an view point direction relative to volume data performed in the embodiment of the present invention.

As shown in FIG. 14, if the positional relationship between the projection plane and the volume data is determined necessarily such that the X, Y and Z axes coincide with the x, y and z axes, respectively, or that the direction of eyes coincides with any one of x, y and z axes, the movement and rotation transformation between the XYZ and xyz coordinate systems is a sole exchange of the coordinate values. The respective coordinates in an area where the volume data exist in the XYZ coordinate system are necessarily transformed to the coordinates of a voxel in the xyz coordinate system, so that no three-dimensional interpolation to calculate the densities, etc., is required. Thus, high-speed three-dimensional image production is achieved.

While in the embodiment the values projected onto each of the points (pixels) on the projection plane 32 of FIG. 2 are explained as being displayed, the number of points (pixels) on the projection plane 32 to which the corresponding voxels are projected does not necessarily coincide with the number of pixels on the display screen. Actually, an image displayed on the display screen is produced on the basis of the image projected onto the projection plane, using an appropriate interpolation process.

As described above, according to the present embodiment, a target area is beforehand extracted and displayed irrespective of a display threshold used. Thus, when a target area exists within the volume data and its density is low and when the target area is small, the target area is displayed by increasing the display threshold and avoiding the display of an area outside the target area. Since the target area and other areas can be displayed simultaneously, the three-dimensional positions of those areas are recognized easily.

By performing edge processing on volume data, the wall of an originally hollow object such as a blood vessel full of a contrast medium can be observed from inside to thereby obtain information on the inside wall of the object such as is obtained by an endoscope.

Since the three-dimensional image producing process is performed at high speed, the display parameters are changed continuously to thereby provide a desired image efficiently.

What is claimed is:

1. A three-dimensional image producing method of projecting a three-dimensional object, defined by volume data composed of a three-dimensional array of voxel data disposed in a three-dimensional space, onto a projection plane disposed in the three-dimensional space to produce an image, comprising the steps of:

inputting to a memory volume data composed of a three-dimensional array of voxel data classified beforehand into a plurality of classifications;

setting a positional relationship between the projection plane and the volume data in the three-dimensional space;

setting a display threshold for density;

setting at least one of the plurality of classifications as a display classification;

determining, as display candidates, voxel data of the input volume data which has a value exceeding the display threshold and voxel data of the input voxel data classified into the set display classification; and projecting the voxel data as the determined display candidate onto the projection plane.

2. A three-dimensional image producing method according to claim 1, further comprising the steps of:

setting at least one of the plurality of classifications as a non-display classification; and wherein the step of determining comprises the steps of determining, as display candidates, that voxel data of the input volume data which has a value exceeding the display threshold and excludes the voxel data classified into a set non-display classification and voxel data classified into the set display classification.

3. A three-dimensional image producing method according to claim 1, further comprising the step of:

handling as a predetermined one a color of that portion of the image projected onto the projection plane in the three-dimensional space and corresponding to the voxel data determined as a display candidate and classified into the display classification.

4. A three-dimensional image producing method according to claim 1, wherein the step of projecting the voxel data as the display candidate comprises the steps of:

obtaining, as temporary projection values, values of the respective voxel data determined as the display candidates and projected onto the projection plane on the assumption that the respective voxel data determined as the display candidates have corresponding optical characteristics depending on the values of said voxel data; and determining the sum of the temporary projection values obtained for the respective voxel data as display candidates projected onto each of the points on the projection plane as the pixel value of a produced image at that of point on the projection plane.

5. A three-dimensional image producing method according to claim 1, wherein the step of projecting the voxel data as the display candidate comprises the step of determining, as the pixel value of a produced image, a projection value obtained for that of the voxel data as the display candidates projected onto each of points on the projection plane and closest to the projection plane.

6. A three-dimensional image producing method of projecting a three-dimensional object, defined by volume data composed of a three-dimensional array of voxel data disposed in a three-dimensional space, onto a projection plane disposed in the three-dimensional space to produce an image, comprising the steps of:

inputting the volume data to a memory;

setting a positional relationship between the projection plane and the volume data in the three-dimensional space;

setting a display threshold for density;

emphasizing a change in the density of the input volume data;

determining, as a display candidate, that voxel data of the volume data of which the edge has been emphasized and which has a value exceeding the display threshold; and projecting the voxel data determined as the display candidate onto the projection plane.

7. A three-dimensional image producing method according to claim 6, wherein the step of emphasizing a change in the density comprises the step of converting the value of each of the voxel data of the volume data to a deviation between that voxel data and the other voxel data present around that voxel of the volume data.

8. A three-dimensional image producing method according to claim 6, wherein the step of projecting the voxel data as the display candidate comprises the steps of:

obtaining, as temporary projection values, values of the respective voxel data determined as the display candidates and projected onto the projection plane on the assumption that the respective voxel data determined as the display candidates have corresponding optical characteristics depending on the values of said voxel data; and determining the sum of the temporary projection values obtained for the respective voxel data as display candidates projected onto each of the points on the projection plane as the pixel value of a produced image at that of point on the projection plane.

9. A three-dimensional image producing method according to claim 6, wherein the step of projecting the voxel data as the display candidate comprises the step of determining, as the pixel value of a produced image, a projection value obtained for that of the voxel data as the display candidates projected onto each of points on the projection plane and closest to the projection plane.

10. A three-dimensional image producing method of projecting a three-dimensional object, defined by volume data composed of a three-dimensional array of voxel data disposed in a three-dimensional space, onto a projection plane disposed in the three-dimensional space to produce an image, comprising the steps of:

inputting the volume data to a memory;

setting a positional relationship between the projection plane and the volume data in the three-dimensional space;

setting a display threshold for density;

obtaining a maximum value of voxel data on a plane perpendicular to each of coordinate axis direction which define the input volume data at a coordinate along that coordinate axis direction;

obtaining a range of coordinates at which the maximum value of voxel data exceeds the threshold in each of the coordinate axis directions;

determining, as a display candidate, voxel data having a value exceeding the threshold in a cuboid which has, as a range of presence in dimensions corresponding to the coordinate axis directions, the range of coordinates at which the maximum value of voxel data exceeds the threshold in each of the coordinate axis directions; and projecting the voxel data determined as the display candidate onto the projection plane.

11. A three-dimensional image producing method according to claim 10, wherein the step of projecting the voxel data as the display candidate comprises the steps of:

obtaining, as temporary projection values, values of the respective voxel data determined as the display candidates and projected onto the projection plane on the assumption that the respective voxel data determined as the display candidates have corresponding optical characteristics depending on the values of said voxel data; and determining the sum of the temporary projection values obtained for the respective voxel data as display candidates projected onto each of the points on the projection plane as the pixel value of a produced image at that of point on the projection plane.

12. A three-dimensional image producing method according to claim 10, wherein the step of projecting the voxel data as the display candidate comprises the step of determining, as the pixel value of a produced image, a projection value obtained for that of the voxel data as the display candidates projected onto each of points on the projection plane and closest to the projection plane.

13. A three-dimensional image producing method of projecting a three-dimensional object, defined by volume data composed of a three-dimensional array of voxel data disposed in a three-dimensional space, onto a projection plane disposed in the three-dimensional space to produce an image, comprising the steps of:

inputting the volume data to a memory;

setting a positional relationship between the projection plane and the volume data in the three-dimensional space;

setting a display threshold for density;

determining a position where the value of voxel data exceeds the threshold first by scanning the three-dimensional space sequentially from its side closer to each of points on the projection plane to its side remoter from that point on the projection plane in the direction normal to the projection plane at a wider interval than the interval of coordinates which define a position in at least one of the coordinate axis directions of a three-dimensional coordinate system set in the three-dimensional space;

determining the position of that of the voxel data having a value exceeding the display threshold and closest to the projection plane by scanning the environment of the determined position at the same interval as the coordinates in the three-dimensional space;

determining, as a display candidate, that of voxel data at a position remoter from the projection plane than the position closest to the projection plane and having a value exceeding the threshold; and projecting the voxel data determined as the display candidate onto the projection plane.

14. A three-dimensional image producing method according to claim 13, wherein the step of determining the position where the value of the voxel data has first exceeded the set threshold comprises the steps of:

determining a position where the value of voxel data first exceeds the threshold by scanning the three-dimensional space sequentially from its side closer to the projection plane to its side remoter from the projection plane in the direction normal to the projection plane in a wider interval than the interval of coordinates which define a position in one of the coordinate axis directions of a three-dimensional coordinate system set in the three-dimensional space.

15. A three-dimensional image producing method according to claim 13, wherein the step of projecting the voxel data as the display candidate comprises the steps of:

obtaining, as temporary projection values, values of the respective voxel data determined as the display candidates and projected onto the projection plane on the assumption that the respective voxel data determined as the display candidates have corresponding optical characteristics depending on the values thereof; and determining the sum of the temporary projection values obtained for the respective voxel data as display candidates projected onto each of the points on the projection plane as the pixel value of a produced image at that of point on the projection plane.

16. A three-dimensional image producing method according to claim 13, wherein the step of projecting the voxel data as the display candidate comprises the step of determining, as the pixel value of a produced image, a projection value obtained for that of the voxel data as the display candidates projected onto each of points on the projection plane and closest to the projection plane.

17. A three-dimensional image producing method of projecting a three-dimensional object, defined by volume data composed of a three-dimensional array of voxel data disposed in a three-dimensional space, onto a projection plane disposed in the three-dimensional space to produce an image, comprising the steps of:

inputting the volume data to a memory;

setting a positional relationship between the projection plane and the volume data in the three-dimensional space;

setting a display threshold for density;

determining, as a display candidate, voxel data having a value exceeding the threshold;

setting a reflectivity and a transmittivity in each of the voxel data determined as display candidates in dependence on the value of an opacity of that voxel data which is obtained by normalization of that voxel value with the difference between the maximum possible value of that voxel data and the threshold;

handling, as a temporary projection value, a value obtained when the rays of light reflected by a respective one of the voxel data determined as the display candidates at its set reflectivity in the three-dimensional space pass through other voxels as the display candidates at their set transmittivities to be projected onto the projection plane having the set positional relationship to the volume data; and handling the sum of the respective temporary projection values obtained for the respective voxel data as display candidates projected onto each of points on the project plane as a pixel value of the produced image.

18. A three-dimensional image producing method according to claim 17, wherein the step of setting a reflectivity and a transmittivity comprise the step of setting, as a reflectivity in each of the voxel data determined as display candidates, a value which is obtained by normalization of that voxel value with the difference between the maximum possible value of that voxel data and the threshold, and setting, as a transmittivity, (1(unity)—the product of the reflectivity and a predetermined constant) when the bracketed calculated value is between 0 (zero) and 1 (unity).

19. A three-dimensional image producing method according to claim 17, wherein the step of setting a reflectivity and a transmittivity comprise the step of setting, as a reflectivity in each of the voxel data determined as display candidates, the product of a predetermined constant and a value which is obtained by normalization of that voxel value with the difference between the maximum possible value of that voxel data and the threshold, and setting, as a transmittivity, (1(unity)—the reflectivity), when the product is at least between 0 (zero) and 1 (unity).

20. A three-dimensional image producing method of projecting a three-dimensional object, defined by volume data composed of a three-dimensional array of voxel data disposed in a three-dimensional space, onto a projection plane disposed in the three-dimensional space to produce an image, comprising the steps of:

inputting the volume data to a memory;

setting a positional relationship between the projection plane and the volume data in the three-dimensional space;

setting a display threshold for density;

determining, as a display candidate, voxel data having a value exceeding the threshold;

setting a reflectivity and a transmittivity in each of the voxel data determined as display candidates in dependence on the value of an opacity of that voxel data, the opacity being determined in accordance with a predetermined function of the threshold and the value of the voxel data as the indicative candidate;

when the rays of light reflected by a respective one of the voxel data determined as the display candidates at its set reflectivity in the three-dimensional space pass through other voxels as the display candidates at their set transmittivities to be projected onto the projection plane, obtaining the projected value of the rays of light as a temporary projection value at a point on the projection plane onto which the voxel data as the display candidate is projected; and handling the sum of the respective temporary projection values obtained for the respective voxel data as display candidates projected onto each of points on the project plane as a pixel value of the produced image.

21. A three-dimensional image producing apparatus for projecting a three-dimensional object, defined by volume data composed of a three-dimensional array of voxel data disposed in a three-dimensional space, onto a projection plane disposed in the three-dimensional space to produce an image, comprising:

a memory for storing volume data composed of a three-dimensional array of voxel data classified beforehand into a plurality of classifications;

means for receiving a disposed relationship between the projection plane and the volume data in the three-dimensional space;

means for receiving a display threshold;

means for receiving the designation of at least one of the plurality of classifications as the designation of a display one;

means for determining, as display candidates, voxel data of the input volume data having a value exceeding the threshold, and voxel data classified into the display classification the designation of which has been received;

rendering means for producing an image by projecting the voxel data determined as the display candidates onto the projection plane; and display means for displaying the produced image.

22. A three-dimensional image producing apparatus for projecting a three-dimensional object, defined by volume data composed of a three-dimensional array of voxel data disposed in a three-dimensional space, onto a projection plane disposed in the three-dimensional space to produce an image, comprising:

a memory for storing volume data composed of a three-dimensional array of voxel data;

means for receiving a disposed relationship between the projection plane and the volume data in the three-dimensional space;

means for receiving the setting of a display threshold continuously;

means for receiving the designation of at least one of the plurality of classifications as the designation of a display one;

means for determining, as display candidates, those of the input volume data having a value exceeding the threshold;

rendering means for producing an image by projecting the voxel data determined as the display candidates onto the projection plane on the assumption that each of the voxel data as the display candidates has an optical characteristic depending on the value thereof; and display means for displaying the produced image.

* * * * *